(12) United States Patent
Iijima

(10) Patent No.: US 6,764,530 B2
(45) Date of Patent: Jul. 20, 2004

(54) EXHAUST HEAT UTILIZATION METHOD FOR CARBON DIOXIDE RECOVERY PROCESS

(75) Inventor: Masaki Iijima, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 28 days.

(21) Appl. No.: 10/320,666

(22) Filed: Dec. 17, 2002

(65) Prior Publication Data

US 2003/0140786 A1 Jul. 31, 2003

(30) Foreign Application Priority Data

Jan. 31, 2002 (JP) ........................................ 2002-024528

(51) Int. Cl.[7] .............................. B01D 53/14; F02G 3/00
(52) U.S. Cl. ............................ 95/183; 60/39.5; 60/691; 95/227; 95/228; 95/236
(58) Field of Search ........................... 95/165, 168, 166, 95/162, 161, 163, 179, 180, 181, 183, 193, 194, 209, 235, 236, 227, 228, 229; 60/39.5, 39.52, 39.511, 310, 650, 671, 685, 690, 691

(56) References Cited

U.S. PATENT DOCUMENTS

| | | | |
|---|---|---|---|
| 3,607,048 A | * | 9/1971 | Karwat ........................ 423/352 |
| 3,803,846 A | * | 4/1974 | Letvin ........................... 60/685 |
| 4,150,953 A | * | 4/1979 | Woodmansee .................. 48/71 |
| 4,436,707 A | * | 3/1984 | Karwat ........................ 423/226 |
| 4,498,289 A | | 2/1985 | Osgerby |
| 4,528,811 A | | 7/1985 | Stahl |
| 4,542,621 A | * | 9/1985 | Andersson et al. ........... 60/775 |
| 4,586,940 A | * | 5/1986 | Stubenvoll ................... 95/207 |
| 4,765,143 A | * | 8/1988 | Crawford et al. ............. 60/671 |
| 4,799,941 A | * | 1/1989 | Westermark .................. 95/199 |
| 4,869,884 A | * | 9/1989 | Riggs, Jr. .................... 423/229 |
| 5,025,631 A | | 6/1991 | Garbo |
| 5,306,331 A | * | 4/1994 | Auvil et al. .................... 95/42 |
| 5,318,758 A | * | 6/1994 | Fujii et al. ................... 423/228 |
| 5,658,361 A | * | 8/1997 | Arencibia, Jr. ............... 96/251 |
| 5,832,712 A | | 11/1998 | Rønning et al. |
| 5,840,100 A | * | 11/1998 | Arencibia, Jr. ............... 95/225 |
| 6,019,819 A | * | 2/2000 | Williams ..................... 95/206 |
| 6,269,624 B1 | | 8/2001 | Frutschi et al. |
| 2003/0140786 A1 | * | 7/2003 | Iijima .......................... 95/168 |

* cited by examiner

*Primary Examiner*—Duane S. Smith
(74) *Attorney, Agent, or Firm*—Oblon, Spivak, McClelland, Maier & Neustadt, P.C.

(57) ABSTRACT

An exhaust heat utilization method for a carbon dioxide recovery process comprises heating returning hot water by at least one heat exchange selected from heat exchange with the regenerated absorbing liquid after heat exchange, heat exchange with carbon dioxide exhausted from the regeneration tower, and heat exchange with saturated water after heating the bottom of the regeneration tower, thereby obtaining hot water.

4 Claims, 3 Drawing Sheets

EXHAUST HEAT UTILIZATION METHOD FOR CARBON DIOXIDE RECOVERY PROCESS

CROSS REFERENCE TO RELATED APPLICATIONS

This application is based upon and claims the benefit of priority from the prior Japanese Patent Application No. 2002-24528, filed Jan. 31, 2002, the entire contents of which are incorporated herein by reference.

BACKGROUND OF THE INVENTION

1. Field of the Invention

The present invention relates to an exhaust heat utilization method for a carbon dioxide recovery process.

2. Description of the Related Art

Conventionally, a large amount of exhaust heat generated in a process of recovering carbon dioxide from a combustion exhaust gas is cooled with cooling water. In a local area where a large amount of cooling water cannot be ensured, a large amount of exhaust heat is cooled using air cooling. Hence, a large amount of low-temperature exhaust heat is discarded without being utilized.

As a system for supplying hot water to a local, conventionally, one shown in FIG. 4 is employed in which heat generated by a power plant is utilized.

More specifically, steam of a boiler 101 is supplied to a steam turbine 102, so a generator 103 generates electricity. The steam is condensed by a condenser 104 and returned to the boiler 101 by a pump 105. The low-pressure steam is extracted from the steam turbine 102 and exchanges heat with water returned from local hot water by a heat exchanger 106. The returned local hot water is thus heated and provided as local hot water. The condensate obtained from the heat exchanged low-pressure steam is returned to the boiler 101 by a pump 107.

In the conventional local hot water system, since the low-pressure steam is extracted from the steam turbine 102, an output from the steam turbine 102 decreases. Consequently, the power generation amount decreases.

BRIEF SUMMARY OF THE INVENTION

It is an object of the present invention to provide an exhaust heat utilization method for a carbon dioxide recovery process, with which returning hot water is heated by utilizing a large amount of exhaust heat generated in a process of recovering carbon dioxide from combustion exhaust gas, so a large amount of hot water to be supplied for local heating or the like can be obtained.

According to an aspect of the present invention, there is provided, an exhaust heat utilization method for a carbon dioxide recovery process, comprising:

providing a carbon dioxide recovery unit comprising a cooling tower, an absorption tower for absorbing a carbon dioxide with an absorbing liquid, and a regeneration tower for regenerating a absorbing liquid;

supplying a combustion exhaust gas to the cooling tower to cool the combustion exhaust gas;

supplying the cooled combustion exhaust gas to the absorption tower so as to come into contact with a regenerated absorbing liquid supplied from the regeneration tower to absorb carbon dioxide in the combustion exhaust gas with the regenerated absorbing liquid, thereby storing a carbon dioxide-absorbed absorbing liquid in a bottom of the absorption tower;

heating the carbon dioxide-absorbed absorbing liquid by heat exchange with the regenerated absorbing liquid supplied from the regeneration tower;

supplying the heated carbon dioxide-absorbed absorbing liquid to the regeneration tower;

heating the bottom of the regeneration tower using saturated steam to separate the carbon dioxide-absorbed absorbing liquid into carbon dioxide and a regenerated absorbing liquid; and discharging and recovering separated carbon dioxide from the regeneration tower, wherein returning hot water is heated by at least one heat exchange selected from heat exchange with the regenerated absorbing liquid after heat exchange, heat exchange with carbon dioxide exhausted from the regeneration tower, and heat exchange with saturated water after heating the bottom of the regeneration tower, thereby obtaining hot water.

In the exhaust heat utilization method for the carbon dioxide recovery process according to the present invention, as the combustion exhaust gas, use of one exhausted from a boiler or gas turbine of a power plant is allowed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An exhaust heat utilization method for a carbon dioxide recovery process according to the present invention will be described in detail with reference to the accompanying drawings.

Figure 1:
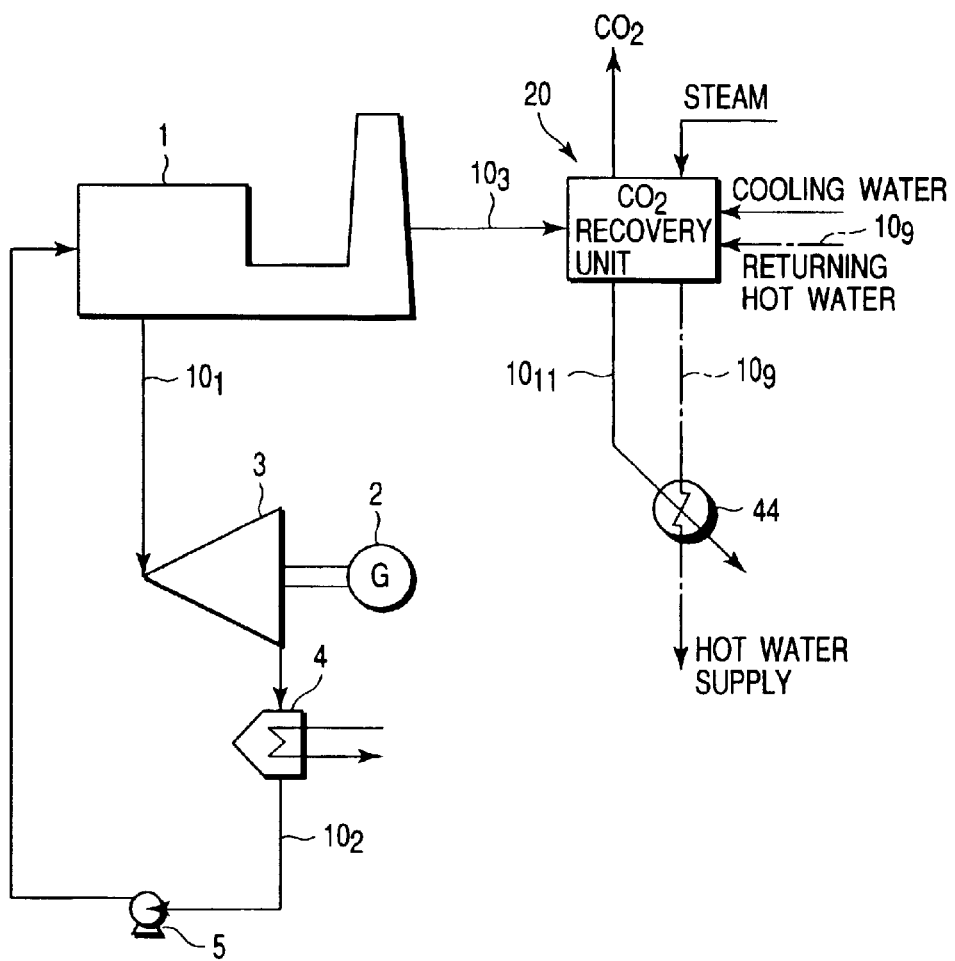
FIG. 1 is a schematic diagram showing a power plant incorporating a carbon dioxide recovery unit to be applied to an exhaust heat utilization method for a carbon dioxide recovery process according to the present invention.
Figure 2:
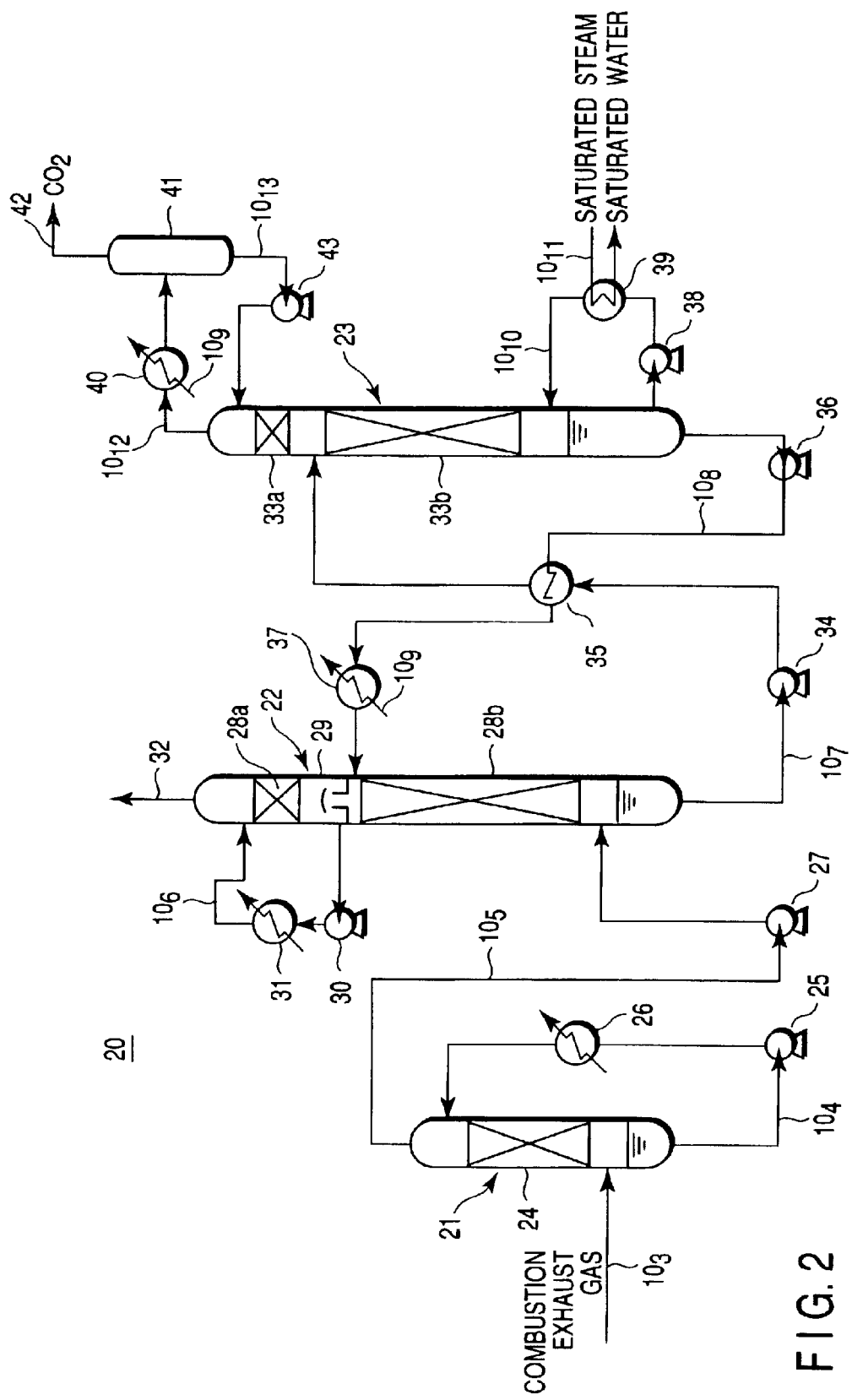
FIG. 2 is a schematic diagram showing the carbon dioxide recovery unit of FIG. 1 in detail.
Figure 3:
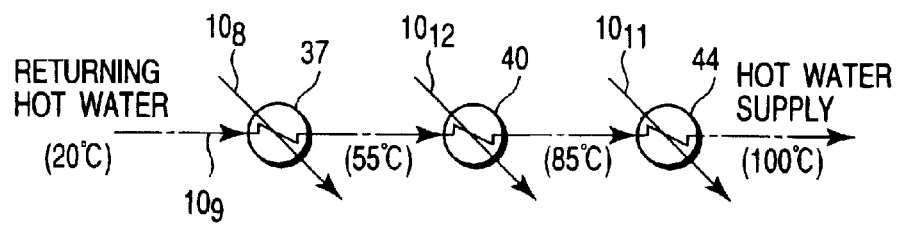
FIG. 3 is a schematic diagram showing a state of heat exchange of returning hot water in the present invention.
Figure 4:
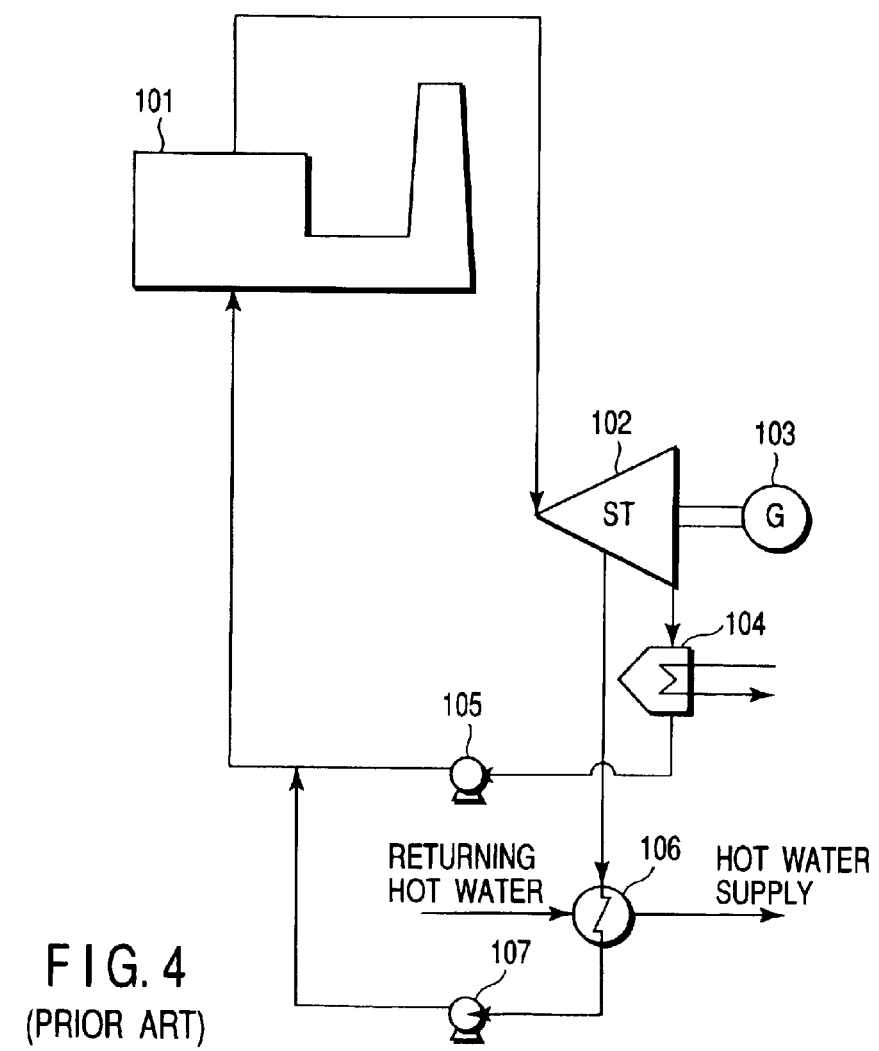
FIG. 4 is a schematic diagram showing a conventional local hot water supply system that utilizes heat of a power plant.

FIG. 1 is a schematic diagram showing a power plant incorporating a carbon dioxide recovery unit, FIG. 2 is a schematic diagram showing the carbon dioxide recovery unit of FIG. 1 in detail, and FIG. 3 is a schematic diagram showing a state of heat exchange of returning hot water.

A boiler 1 is connected to a steam turbine 3 with a generator 2 through a passageway $10_1$. The steam turbine 3 is connected to the boiler 1 through a passageway $10_2$. A condenser 4 for condensing steam, and a pump 5 are sequentially inserted in the passageway $10_2$.

The boiler 1 is connected to a carbon dioxide recovery unit 20 through a passageway $10_3$. As shown in FIG. 2, the carbon dioxide recovery unit 20 has a cooling tower 21, absorption tower 22, and regeneration tower 23 that are adjacent to each other.

The cooling tower 21 is connected to the boiler 1 through the passageway $10_3$. The cooling tower 21 incorporates a gas-liquid contact member 24. The ends of a circulating passageway $10_4$ connected to the bottom and upper portion of the cooling tower 21. A first pump 25 and first heat exchanger 26 are sequentially inserted in the circulating passageway $10_4$ from the bottom side of the cooling tower 21. Cooling water is sprayed to the upper portion of the cooling tower 21 through the circulating passageway $10_4$, so a combustion exhaust gas introduced through the passageway $10_3$ is cooled with the gas-liquid contact member 24. The top of the cooling tower 21 is connected to near the lower portion of the absorption tower 22 through a passageway $10_5$. A blower 27 is inserted in the passageway $10_5$.

The absorption tower 22 incorporates upper and lower gas-liquid contact members 28a and 28b. An overflow portion 29 for a regenerated absorbing liquid is arranged between the gas-liquid contact members 28a and 28b. One end of a passageway $10_6$ is connected to the overflow portion 29 of the absorption tower 22. The other end of the passageway $10_6$ is connected to a portion above the gas-liquid contact member 28a at the upper portion of the absorption tower 22 through a pump 30 and second heat exchanger (wash water cooler) 31. An exhaust pipe 32 is connected to the top of the absorption tower 22.

The regeneration tower 23 incorporates upper and lower gas-liquid contact members 33a and 33b.

The bottom of the absorption tower 22 is connected through a passageway $10_7$ to the upper portion of the regeneration tower 23, between the upper and lower gas-liquid contact members 33a and 33b. A pump 34 and third heat exchanger 35 are sequentially inserted in the passageway $10_7$ from the absorption tower 22 side.

The bottom of the regeneration tower 23 is connected through a passageway $10_8$ that runs via the third heat exchanger 35 to that upper portion of the absorption tower 22 where the overflow portion 29 is located. A pump 36 is inserted in the passageway $10_8$, between the bottom of the regeneration tower 23 and the third heat exchanger 35. A fourth heat exchanger (absorbing liquid cooler) 37 is inserted in the passageway $10_8$, between the third heat exchanger 35 and absorption tower 22. A returning hot water passageway $10_9$ intersects the fourth heat exchanger 37, as shown in FIGS. 2 and 3. The returning hot water flowing through the returning hot water passageway $10_9$ exchanges heat with the fourth heat exchanger 37.

One end of a passageway $10_{10}$ is connected to near the lower portion of the regeneration tower 23. The other end of the passageway $10_{10}$ is connected to the regeneration tower 23, immediately below the gas-liquid contact member 33b. A pump 38 and fifth heat exchanger 39 are sequentially inserted in the passageway $10_{10}$ from near the lower portion of the regeneration tower 23. The fifth heat exchanger 39 intersects a passageway $10_{11}$ to which saturated steam is introduced, and exchanges heat with the saturated steam.

One end of a passageway $10_{12}$ is connected to the top of the regeneration tower 23. The other end of the passageway $10_{12}$ is connected to a gas-liquid separator 41 through a sixth heat exchanger (returning flow cooler) 40. Carbon dioxide separated by the gas-liquid separator 41 is recovered through an exhaust pipe 42. As shown in FIGS. 2 and 3, the returning hot water passageway $10_9$ running via the fourth heat exchanger 37 intersects the sixth heat exchanger 40. The returning hot water flowing through the returning hot water passageway $10_9$ exchanges heat with the sixth heat exchanger 40. The gas-liquid separator 41 is connected to the top of the regeneration tower 23 through a passageway $10_{13}$. A pump 43 is inserted in the passageway $10_{13}$.

As shown in FIGS. 1 and 3, the returning hot water passageway $10_9$ running via the sixth heat exchanger 40 intersects a seventh heat exchanger 44 that intersects the passageway $10_{11}$ through which the saturated water flows. The returning hot water flowing through the passageway $10_9$ exchanges heat with the seventh heat exchanger 44.

The exhaust heat utilization method for the carbon dioxide recovery process will be described with reference to the power plant incorporating the carbon dioxide recovery unit shown in FIGS. 1 to 3.

Steam generated in the boiler 1 is supplied to the steam turbine 3 through the passageway $10_1$, so the generator 2 generates electricity. The steam from the steam turbine 3 is supplied to the condenser 4 through the passageway $10_2$ and condensed by it. The generated condensate is returned to the boiler 1 by the pump 5.

A combustion exhaust gas generated by the boiler 1 is supplied to the cooling tower 21 of the carbon dioxide recovery unit 20 through the passageway $10_3$. Treated water extracted from the bottom of the cooling tower 21 when the first pump 25 is driven is cooled while it flows via the circulating passageway $10_4$ in which the first heat exchanger 26 is inserted. The cooling water is sprayed to the upper portion of the cooling tower 21. Hence, the combustion exhaust gas introduced through the passageway $10_3$ is cooled by the gas-liquid contact member 24.

As the blower 27 is driven, the cooled combustion exhaust gas is supplied from the top of the cooling tower 21 to near the lower portion of the absorption tower 22 through the passageway $10_5$. While the combustion exhaust gas supplied to the absorption tower 22 flows upward through the lower gas-liquid contact member 28b in the absorption tower 22, it comes into contact with a regenerated absorbing liquid, e.g., a regenerated amine liquid, supplied to the overflow portion 29 of the absorption tower 22. Then, carbon dioxide in the combustion exhaust gas is absorbed by the regenerated amine liquid to produce a carbon dioxide-absorbed amine liquid. The regenerated amine liquid is supplied from the regeneration tower 23 to the overflow portion 29 of the absorption tower 22 through the passageway $10_8$ running via the third and fourth heat exchangers 35 and 37. While the combustion exhaust gas further flows upward through the upper gas-liquid contact member 28a via the overflow portion 29, it comes into contact with a regenerated amine liquid, supplied to the top of the absorption tower 22, so carbon dioxide in the combustion exhaust gas is absorbed by the regenerated amine liquid to produce a carbon dioxide-absorbed amine liquid. At this time, the combustion exhaust gas is cooled so the water balance of the entire system is held, and amine vapor is not be exhausted to the outside of the system. As the pump 30 is driven, the regenerated amine liquid is supplied to near the top of the absorption tower 22 via the passageway $10_6$. The combustion exhaust gas from which carbon dioxide has been removed is discharged to the atmosphere through the exhaust pipe 32.

The carbon dioxide-absorbed amine liquid is stored at the bottom of the absorption tower 22. As the pump 34 is driven, the stored carbon dioxide-absorbed amine liquid is supplied through the passageway $10_7$ to the regeneration tower 23, between the two gas-liquid contact members 33a and 33b. At this time, the amine liquid which has absorbed carbon dioxide is heated as it is heat-exchanged by the third heat exchanger 35. The third heat exchanger 35 is located at the intersection of the passageways $10_7$ and $10_8$. The regenerated amine liquid with a comparatively high temperature located in the bottom of the regeneration tower 23 flows through the passageway $10_8$. Also, the regenerated amine liquid is cooled.

The heated carbon dioxide-absorbed amine liquid is separated into carbon dioxide and a regenerated amine liquid while it flows downward through the lower gas-liquid contact member 33b of the regeneration tower 23. At this time, as the pump 38 is driven, the regenerated amine liquid stored in the bottom of the regeneration tower 23 is circulated through the passageway $10_{10}$ in which the fifth heat exchanger 39 is inserted. The regenerated amine liquid then exchanges heat with saturated steam supplied to the fifth heat exchanger 39 through the passageway $10_{11}$, so it is heated. The regenerated amine liquid heated by the fifth heat exchanger 39 is utilized as a heat source for heating the regeneration tower 23 itself.

The regenerated amine liquid separated in the regeneration tower 23 is stored in the bottom of the regeneration tower 23. As the pump 36 is driven, the regenerated amine liquid in the bottom of the regeneration tower 23 is returned to the absorption tower 22 through the passageway $10_8$.

Separated carbon dioxide flows upward through the upper gas-liquid contact member 33a of the regeneration tower 23 and flows through the passageway $10_{12}$ from the top of the regeneration tower 23. During this period of time, separated carbon dioxide is cooled by the sixth heat exchanger 40 inserted in the passageway $10_{12}$, so water steam carried together with carbon dioxide is condensed. Carbon dioxide is then sent to the gas-liquid separator 41 and is separated into carbon dioxide and an unseparated amine liquid. Carbon dioxide is recovered through the exhaust pipe 42. The amine liquid is returned to the regeneration tower 23 through the passageway $10_{13}$.

In the carbon dioxide recovery process described above, the returning hot water is supplied to the returning hot water passageway $10_9$ in which the fourth, sixth, and seventh heat exchangers 37, 40, and 44 are inserted, as shown in FIGS. 1 to 3. At this time, the returning hot water flowing through the returning hot water passageway $10_9$ is heat-exchanged, first by the fourth heat exchanger 37, with the regenerating amine liquid at a temperature of, e.g., 60 to 70° C., flowing through the passageway $10_8$. The passageway $10_8$ intersects the fourth heat exchanger 37. Thus, the returning hot water is heated. Subsequently, the returning hot water is heat-exchanged by the sixth heat exchanger 40 with carbon dioxide and water steam at a temperature of, e.g., 90 to 100° C., exhausted from the regeneration tower 23 and flowed through the passageway $10_{12}$. The passageway $10_{12}$ intersects the sixth heat exchanger 40. Thus, the returning hot water is heated. Finally, the returning hot water is heat-exchanged by the seventh heat exchanger 44 with saturated water at a temperature of, e.g., 120 to 140° C., flowing through the passageway $10_{11}$. The passageway $10_{11}$ intersects the seventh heat exchanger 44. Thus, the returning hot water is heated to a target temperature, and is utilized as hot water for, e.g., local heating.

More specifically, as shown in FIG. 3, the returning hot water of 20° C. is heat-exchanged by the fourth heat exchanger 37 so it is heated to 55° C. The returning hot water is then heat-exchanged by the sixth heat exchanger 40 so it is heated to 85° C. Finally, the returning hot water is heat-exchanged by the seventh heat exchanger 44 so it is heated to 100° C., a target hot water temperature. When the returning hot water is supplied to heat exchangers from one with a low temperature to one with a high temperature in this manner, it can be heated to the target hot water temperature efficiently.

Therefore, according to the present invention, in the process of recovering carbon dioxide from a combustion exhaust gas of a combustion exhaust gas generation source, e.g., a boiler, returning hot water is heated by utilizing a large amount of exhaust heat which is generated in the recovery process and conventionally cooled with cooling water and discarded. Hence, a large amount of hot water for local heating or the like can be obtained at a low cost.

When the exhaust heat utilizing method of the present invention is applied to a power plant having a boiler, local hot water can be supplied by the carbon dioxide recovery process without extracting a low-pressure steam from the steam turbine as in the conventional local hot water system. Hence, an output drop of the steam turbine accompanying extraction of the low-pressure steam can be prevented.

In the above embodiment, hot water is obtained by heating the returning hot water utilizing all of the fourth, sixth, and seventh heat exchangers 37, 40, and 44, but the present invention is not limited to this. For example, hot water may be obtained by heating the returning hot water utilizing either one of the fourth, sixth, and seventh heat exchangers 37, 40, and 44, or two or more of them. When two or more heat exchangers are utilized, the order with which hot water is supplied to the heat exchangers is not particularly limited.

In the above embodiment, hot water is obtained by heating the returning hot water utilizing the fourth, sixth, and seventh heat exchangers 37, 40, and 44 through which a fluid with a comparatively high temperature flows, but the present invention is not limited to this. For example, before the returning hot water is heat-exchanged by the fourth heat exchanger 37, it may be heated by being heat-exchanged by either one or both of the first and second heat exchangers 26 and 31 shown in FIG. 2. Cooling water with a temperature of, e.g., 20 to 50° C. intersects the first heat exchanger 26. Cooling water with a temperature of, e.g., 20 to 50° C. intersects the heat exchanger 31. A fluid with a temperature lower than that of the forth, sixth, and seventh heat exchangers flows through the first and second heat exchangers 26 and 31.

The combustion exhaust gas generation source is not limited to a boiler.

As has been described above, according to the present invention, in a process of recovering carbon dioxide from a combustion exhaust gas, there can be provided an exhaust heat utilization method of heating returning hot water by utilizing a large amount of exhaust heat which is generated in the recovery process, so a large amount of hot water to be supplied for local heating or the like can be obtained at a low cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An exhaust heat utilization method for a carbon dioxide recovery process comprising:

provided a carbon dioxide recovery unit comprising a cooling tower, an absorption tower for absorbing a carbon dioxide with an absorbing liquid, and a regeneration tower for regenerating a absorbing liquid;

supplying a combustion exhaust gas to said cooling tower to cool the combustion exhaust gas;

supplying the cooled combustion exhaust gas to said absorption tower so as to come into contact with a regenerated absorbing liquid supplied from said regeneration tower to absorb carbon dioxide in the combustion exhaust gas with the regenerated absorbing liquid, thereby storing a carbon dioxide-absorbed absorbing liquid in a bottom of said absorption tower;

heating the carbon dioxide-absorbed absorbing liquid by heat exchange with the regenerated absorbing liquid supplied from said regeneration tower;

supplying the heated carbon dioxide-absorbed absorbing liquid to said regeneration tower;

heating the bottom of said regeneration tower using saturated steam to separate the carbon dioxide-absorbed absorbing liquid into carbon dioxide and a regenerated absorbing liquid; and discharging and recovering separated carbon dioxide from said regeneration tower, wherein returning hot water is heated by at least one heat exchange selected from heat exchange with the regenerated absorbing liquid after heat exchange, heat exchange with carbon dioxide exhausted from said regeneration tower, and heat exchange with saturated water after heating the bottom of said regeneration tower, thereby obtaining hot water.

2. A method according to claim 1, wherein the combustion exhaust gas is exhausted from a boiler or gas turbine of a power plant.

3. A method according to claim 1, wherein the absorbing liquid is an amine liquid.

4. A method according to claim 1, wherein the returning hot water is heated first by heat exchange with the regenerated absorbing liquid after heat exchange, subsequently by heat exchange with carbon dioxide exhausted from said regeneration tower, and finally by heat exchange with saturated water after heating the bottom of said regeneration tower, thereby obtaining hot water.

* * * * *